(12) United States Patent
Bossecker et al.

(10) Patent No.: US 6,994,371 B2
(45) Date of Patent: Feb. 7, 2006

(54) OCCUPANT PROTECTION DEVICE FOR MOTOR VEHICLE OCCUPANTS

(75) Inventors: Maximilian Bossecker, Baden-Baden (DE); Ulrich Karlbauer, Ulm (DE); Robert Getz, Ulm (DE)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/602,004

(22) Filed: Jun. 24, 2003

(65) Prior Publication Data

US 2004/0056457 A1    Mar. 25, 2004

(30) Foreign Application Priority Data

Jun. 25, 2002    (DE) ................. 102 29 102

(51) Int. Cl.
*B60R 21/22*    (2006.01)

(52) U.S. Cl. ............... 280/730.2; 280/749; 280/753

(58) Field of Classification Search ........... 280/753, 280/749, 730.2
See application file for complete search history.

(56) References Cited

U.S. PATENT DOCUMENTS

| | | | |
|---|---|---|---|
| 5,975,566 A * | 11/1999 | Bocker et al. ........... 280/730.2 |
| 6,168,193 B1 | 1/2001 | Shirk et al. | |
| 6,237,938 B1 | 5/2001 | Boxey | |
| 6,241,277 B1 | 6/2001 | Heigl et al. | |
| 6,347,807 B1 * | 2/2002 | Schink et al. ............ 280/730.2 |
| 6,361,068 B1 | 3/2002 | Stein et al. | |
| 6,412,810 B1 * | 7/2002 | Wipasuramonton et al. ..... 280/730.2 |
| 6,464,250 B1 * | 10/2002 | Faigle et al. ............. 280/730.2 |
| 6,474,678 B1 * | 11/2002 | Boxey ..................... 280/728.2 |
| 2002/0008370 A1 | 1/2002 | Haland et al. | |

FOREIGN PATENT DOCUMENTS

| | | |
|---|---|---|
| DE | 44 20 1256 A1 | 12/1994 |
| DE | 195 19 297 A1 | 12/1995 |
| DE | 296 15 485 U1 | 2/1997 |
| DE | 196 54 490 A1 | 6/1998 |
| DE | 197 07 347 A1 | 9/1998 |
| DE | 100 09 332 A1 | 10/2000 |
| DE | 199 26 269 A1 | 12/2000 |
| EP | 0 847 904 A1 | 6/1998 |
| EP | 0 849 129 A1 | 6/1998 |
| EP | 1 201 509 A1 | 5/2002 |

* cited by examiner

*Primary Examiner*—Eric Culbreth
(74) *Attorney, Agent, or Firm*—Foley & Lardner LLP

(57) ABSTRACT

An occupant protection device for a motor vehicle occupant. The device includes an airbag arranged on a motor vehicle body in the region of a lateral roof edge of a motor vehicle, the airbag being configured to deploy downwards during inflation so that the inflated airbag extends in front of at least one side window of the motor vehicle; and a guide extending longitudinally and being connected to the lower edge of the airbag. The guide is movably guided on the motor vehicle body in the direction of deployment of the airbag.

27 Claims, 3 Drawing Sheets

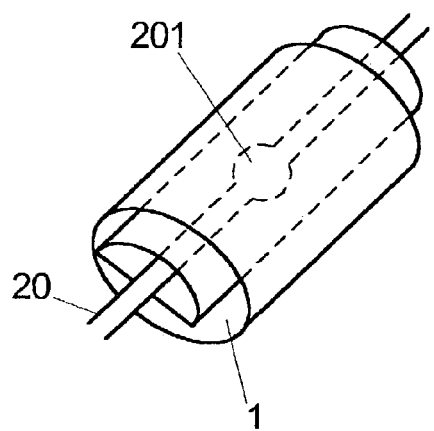
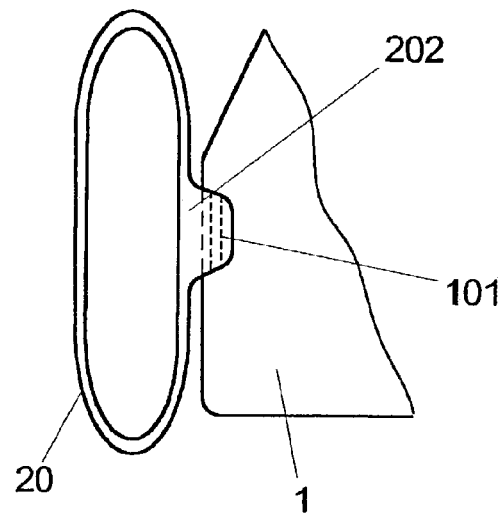
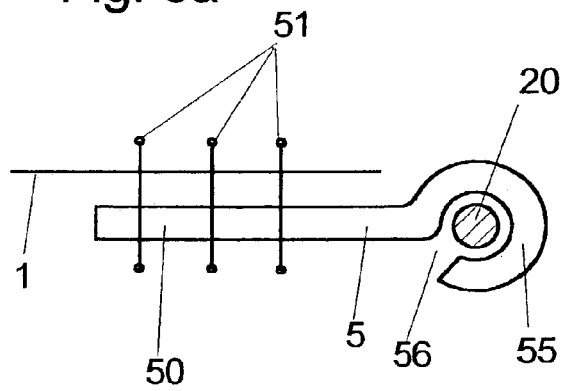
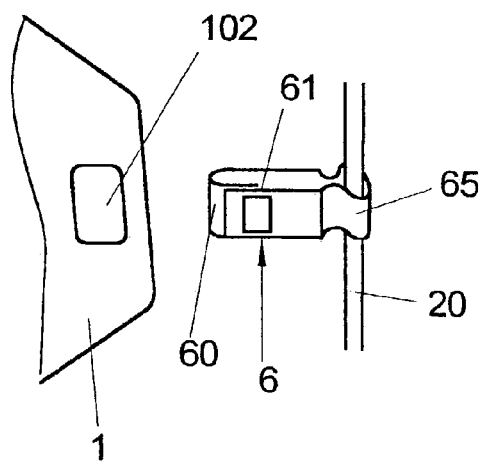
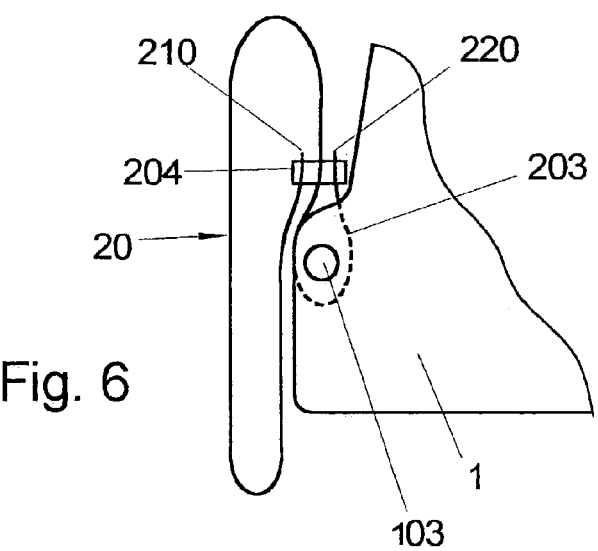

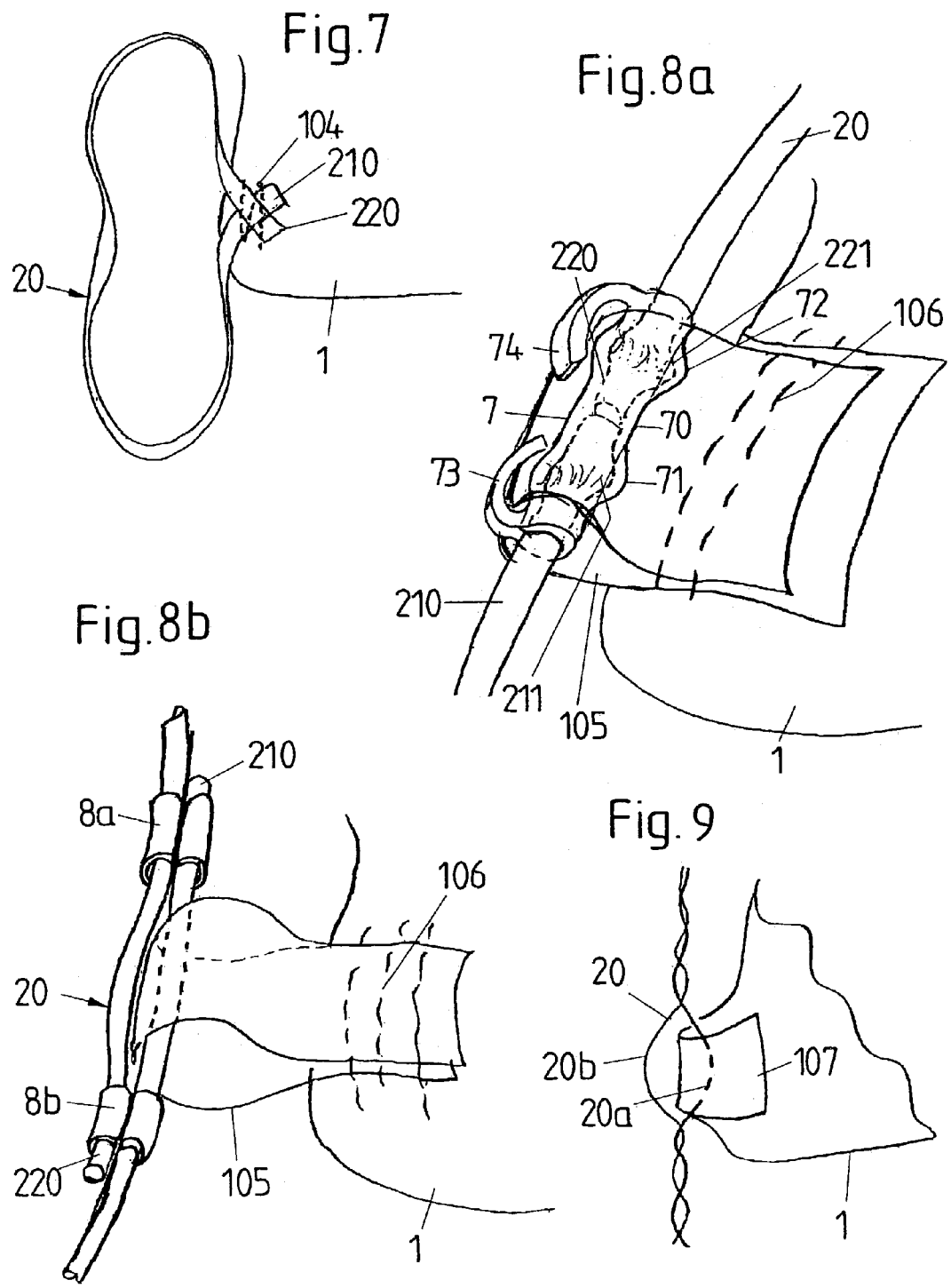

OCCUPANT PROTECTION DEVICE FOR MOTOR VEHICLE OCCUPANTS

BACKGROUND OF THE INVENTION

The invention relates to an occupant protection device for motor vehicle occupants.

It is known to arrange an airbag on a motor vehicle body in the region of the lateral roof edge of the motor vehicle so that it is deployed downwards during inflation by means of a gas generator, so that, in the inflated state, it extends in the manner of a curtain in front of at least one side window of the motor vehicle.

One problem in occupant protection devices of the type discussed above for motor vehicles is to ensure that the lower edge of the airbag is sufficiently tensioned in the inflated state to prevent the situation where, in the event of a crash, for example when the motor vehicle overturns, the motor vehicle occupant to be protected may be thrown out through a side window of the motor vehicle.

SUMMARY OF THE INVENTION

A device of this type, which in one exemplary embodiment provides for controlled guidance of the lower edge of an airbag comprises an airbag which is arranged on a motor vehicle body in the region of the lateral roof edge of the motor vehicle and which is deployed downwards during inflation by means of a gas generator, so that, in the inflated state, it extends in the manner of a curtain in front of at least one side window of the motor vehicle, the top edge of the airbag running along the roof edge of the motor vehicle, and the lower edge of the airbag running approximately level with a door breastwork (for example, in the vehicle longitudinal direction). Furthermore, guide means are provided, by which the lower edge of the airbag can be guided downwards in the direction of deployment of the airbag during inflation, for which the guide means are connected to a portion of the airbag in the region of the lower edge of the airbag.

Accordingly, the lower edge of the airbag is connected to a portion of an elongated element serving for guiding the lower edge of the airbag in the direction of deployment during the inflation of the airbag, the said portion being guided movably on the motor vehicle body in the direction of deployment of the airbag (and, for example, being extended in this direction).

As a result, during the deployment of the airbag, the lower edge of the airbag can be guided in a controlled manner into a position in which sufficient and reliable tensioning of the lower edge of the airbag is ensured. For this purpose, the longitudinally extended element does not have to be moved actively in the direction of deployment by means of an additional drive, but, instead, the movement of the longitudinally extended element in the direction of deployment can be brought about by the airbag itself which is deployed during inflation.

Certain embodiments of the present invention function on the principal that the longitudinally extended element is guided by means of suitable guide elements in such a way that a deployment in the desired direction deployment is imparted to the lower edge of the airbag as a result of co-operation with the longitudinally extended element. In other words, the longitudinally extended element is to be guided in such a way that, by virtue of the forces exerted on the longitudinally extended element during the deployment of the airbag, a movement of the longitudinally extended element in the desired direction of deployment of the airbag is triggered.

As a result, it becomes possible to have a controlled deployment of the airbag, in particular of the lower edge of the airbag, into a position in which the lower edge of the airbag has sufficient tension. The longitudinally extended element is, in some embodiments, a flexible traction means, for example in the form of a cable or of a band.

In order to maintain the position of the lower edge of the airbag which is determined by means of the guide element during the deployment of the airbag, a run-back stop may be provided, which prevents a movement of the longitudinally extended element opposite to the direction in which the element had moved during deployment.

Deflection elements may serve for guiding the longitudinally extended element in the desired direction of deployment of the airbag, the run-back stop being arranged next to one of the deflection elements.

According to an embodiment of the invention, the longitudinally extended element is designed as a closed (endless) loop, whilst, according to another embodiment, the longitudinally extended element is secured with one free end to the airbag and with the other free end to a part of the motor vehicle body.

According to one embodiment of the invention, the longitudinally extended element is guided by means of two guide elements which are spaced apart from one another in the direction of deployment of the airbag and which are designed, in particular, in each case as deflection elements and are connected to the vehicle body. These two guide or deflection elements ensure a controlled positioning of the longitudinally extended element along the vehicle body even before the deployment of the airbag. This is because, by virtue of their connection to the vehicle body, the two guide or deflection elements form a body-side guide device, by means of which the longitudinally extended element is guided in a defined manner even before the deployment of the airbag (and also in the state in which the airbag is stowed away at the roof-edge region of the corresponding motor vehicle).

During an inflation of the airbag in the event of a crash, according to what is known as the "flagpole principle", a movement of the longitudinally extended element takes place merely in that another portion of the longitudinally extended element enters the region between the two guide or deflection elements and that portion of the longitudinally extended element which is located between the two deflection elements before the inflation of the airbag is guided out of this region. What is achieved thereby is a defined and reliable guidance of the airbag by means of the longitudinally extended element in the region between the two deflection elements, to be precise, controlled guidance along the vehicle body.

The two deflection elements may in this case be connected directly to a part of the vehicle body, such as, for example, a holding plate, that is to say, in particular, be arranged or fastened directly on a part of the vehicle body, or, alternatively, be connected to a part of the vehicle body via a further subassembly, for example in the form of an elastic element. In some embodiments of the invention, neither of the two deflection elements is arranged on the airbag itself, that is to say is not moved jointly with the airbag in the direction of deployment during the deployment of the airbag. A part of the motor vehicle body accordingly refers to any desired body-fixed carrying parts, in particular in the form of a holding element.

There may be provision, furthermore, for the movement of that portion of the longitudinally extended element which is connected to the airbag in the desired direction of deployment to be assisted by a spring element coupled to the longitudinally extended element. This embodiment is advantageous particularly when the longitudinally extended element is fixed in the manner of an open system with one end to the airbag and with the other end to the motor vehicle body. The spring force also contributes to a defined tautening of the longitudinally extended element.

According to a development of the invention, that portion of the longitudinally extended element which is connected to the lower edge of the airbag is guided at an inclination with respect to the main direction of deployment of the airbag (which points vertically downwards from the roof edge of the vehicle along the vertical vehicle axis) in such a way that the lower edge of the airbag is increasingly tautened during deployment. The longitudinally extended element then serves, therefore, to reinforce the tautening of the lower edge of the airbag. An additional movement of the lower edge in the vehicle longitudinal direction, which reinforces the tautening of the lower edge, is imparted to the natural direction of deployment of the airbag downwards from the roof edge.

The subassemblies serving for guiding and/or tautening the longitudinally extended element may be arranged at least partially on a holding element (holding panel), present in any case, of the gas generator used for inflating the airbag.

In order to achieve as high a tautening of the lower edge of the airbag as possible, in an advantageous embodiment of the invention the longitudinally extended element is guided and tautened in such a way that that portion of the longitudinally extended element which is connected to the airbag is not deflected transversely to the direction of extent of the longitudinally extended element during the inflation and deployment of the airbag.

In one embodiment of the invention, there is provision for the lower edge of the airbag to be guided by means of the longitudinally extended element at only one end, in particular at an end assigned to a vertical column, for example the B-column, of the vehicle, whilst the other end of the airbag is arranged in a body-fixed manner.

Different fastening methods may be used in order to connect the airbag to the longitudinally extended element.

The connection between the airbag and the longitudinally extended element, in particular in the form of a cable or band, may take place unreleasably, for example in a materially integral manner, by adhesive bonding or welding.

Furthermore, a connection may take place by stitching when a portion which can be connected to the fabric of the airbag by a seam is provided on the longitudinally extended element.

For a releasable connection between the airbag and the longitudinally extended element, there may be a provision for knotting the longitudinally extended element to the airbag, using an orifice formed on the airbag. In another variant, a loop of the longitudinally extended element may be laid around a dart provided on the airbag and/or a releasable connection between the airbag and the longitudinally extended element may be made, using a clip element which is connected, on the one hand, to the airbag and, on the other hand, to the longitudinally extended element. In a further embodiment, a tab or pocket, to which the longitudinally extended element is suitably connected, may be arranged on the airbag casing.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 3 shows a diagrammatic illustration relating to the connection of a longitudinally extended element of the guide device to the airbag.

FIG. 4 shows a diagrammatic illustration of a connection between the airbag and the longitudinally extended element by stitching.

FIG. 5a shows a diagrammatic illustration of a connection between the airbag and the longitudinally extended element by means of a clip.

FIG. 5b shows a diagrammatic illustration of a connection between the airbag and the longitudinally extended element by means of a clip.

FIG. 6 shows a diagrammatic illustration of a connection between the airbag and the longitudinally extended element by means of a loop of the longitudinally extended element, the said loop looping around a dart of the airbag.

FIG. 7 shows a diagrammatic illustration of the connection between the airbag and the longitudinally extended element by the stitching of the two ends of the longitudinally extended element to the airbag.

FIG. 8a shows an example of a connection between the airbag and the longitudinally extended element, using a pocket provided on the airbag.

FIG. 8b shows an example of a connection between the airbag and the longitudinally extended element, using a pocket provided on the airbag.

FIG. 9 shows a modification of the exemplary embodiments of FIGS. 8a and 8b.

DETAILED DESCRIPTION

Figure 1:
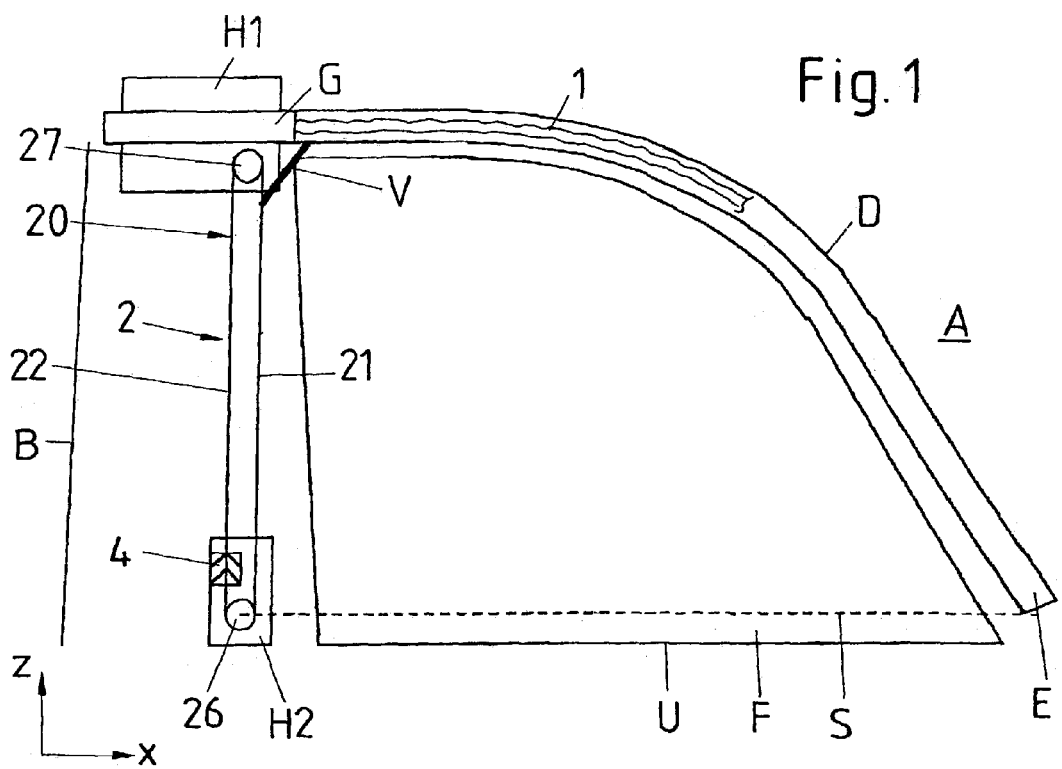
FIG. 1 shows a view of the lateral body of a motor vehicle in the region of a front side window, with a guide device for guiding an airbag, arranged in the roof-edge region, during deployment.

As mentioned above, an exemplary embodiment of the present invention includes an air bag as illustrated in FIG. 1. FIG. 1 shows a view of the lateral body of a motor vehicle in the region of a front side window F. The window F is delimited upwards and forwards by the roof-edge region D of the motor vehicle, the said roof-edge region extending forwards as far as the A-column of the motor vehicle with respect to the vehicle longitudinal axis x. The front side window F is delimited rearwards by the B-column running vertically (along the vertical vehicle axis z) and downwards in the usual way by a door breastwork.

An airbag module is arranged in a known way on the roof-edge region D of the vehicle body, the airbag module comprising an airbag 1 which, in the folded state, extends along the entire roof-edge region D bordering the front side window F. The airbag is inflatable by means of a gas generator G which is fastened to a holding panel H1 arranged at the upper end of the B-column.

During the inflation of the airbag 1 by means of the gas generator G, the airbag is deployed downwards in the direction of the lower edge U of the front side window F and thereby forms, in front of the side window F, a curtain which can serve as head protection for a vehicle occupant and, moreover, can prevent a vehicle occupant from being thrown out through the side window F. In this respect, the lower edge of the deployed airbag is tensioned along a tension line S which runs from the front end E of the roof-edge region D to the B-column B in the vehicle longitudinal direction.

In the exemplary embodiment illustrated in FIG. 1, the front end of the lower edge of the airbag (corresponding the front end of the tension line S) is secured fixedly to the front lower region E of the roof-edge region D. By contrast, the rear end of the lower edge of the airbag 1 is connected by means of a connection element V to the first portion 21 of a longitudinally extended element 20 in the form of a cable which forms a closed loop and which constitutes an integral part of a guide device 2 for guiding the rear end of the lower edge of the airbag during deployment of the airbag.

The cable 20 is guided by means of two deflection elements 26, 27 in such a way that one portion 21 of the cable 20 runs adjacently to the rear edge of the window F and another portion 22 of the cable extends on that side of the first portion 21 which faces away from the window F. The two portions 21, 22 of the cable 20 run essentially parallel to the vertical vehicle axis z along the B-column B. However, for a higher tautening of the lower edge of the airbag 1 along the tension line S, a greater inclination of at least one of the portions 21, 22 of the cable 20 to the vertical vehicle axis z may also be advantageous, as will become clear further below with reference to FIG. 2.

As shown in FIG. 1, the lower of the two deflection elements 26, 27 spaced apart from one another along the vertical vehicle axis z is arranged on a holding plate H2 (holding panel) which is arranged on the B-column B, approximately level with the lower window edge U. The other deflection element 27 is arranged on the holding plate H1 which also serves for receiving the gas generator G. The deflection elements may be, for example, rotatably mounted cable rollers.

Furthermore, the lower holding plate H2 has arranged on it a run-back stop 4 which allows a movement of the cable 20 such that the first cable portion 21 moves downwards (in the direction of deployment of the airbag 1) and the second cable portion 22 moves upwards in the opposite direction, whilst a movement of the cable 20 in the reverse direction is blocked.

If, in the event of a crash, the occupant protection device illustrated in FIG. 1 is triggered by means of a sensor, the airbag 1 is inflated by gases flowing out of the gas generator G and is at the same time deployed from the roof-edge region D downwards in the direction of the lower edge U of the front side window F. In this case, the rear end of the lower edge of the airbag 1, the said rear end being connected to the first portion 21 of the cable 20 via a connection element V, is guided exactly along the path defined by the cable portion 21. In this case, by virtue of the forces acting downwards during the deployment of the airbag 1, this cable portion 21 is moved, together with the rear end of the lower edge of the airbag 1, downwards, that is to say a loop-forming cable 20 as a whole is moved clockwise around the deflection elements 26, 27 designed as cable rollers.

After the complete deployment and inflation of the airbag 1, the rear end of the lower edge of the airbag 1 is located in the region of the lower deflection element 26, the rear end of the lower edge going downwards to this point as a result of a movement of the first cable portion 21. (The first cable portion 21 and the second cable portion 22 designate in each case that portion of the cable which is adjacent to the front side window F or faces away from the front side window F. That is to say, the regions of the cable 20 which in each case form the first cable portion 21 and the second cable portion 22 change in the event of a movement of the cable 20 around the deflection elements 26, 27.)

The lower edge of the airbag 1 is then tensioned and thereby tautened along the tension line S between the front lower end E of the roof-edge region D, where the front end of the lower edge of the airbag 1 is fixed, and the lower end of the first cable portion 21, where the rear end of the lower region of the airbag 1 is fixed.

Figure 2:
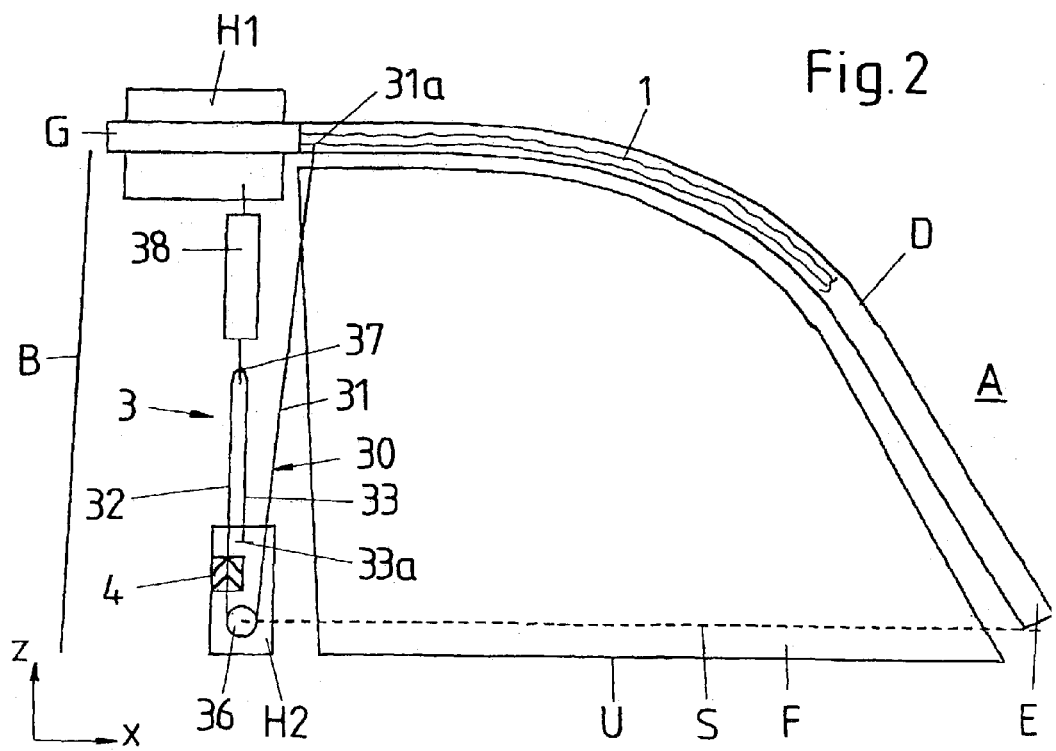
FIG. 2 shows a modification of the exemplary embodiment of FIG. 1.

The exemplary embodiment illustrated in FIG. 2 differs from that shown in FIG. 1 in the design of the guide device 3 which serves for guiding the rear end of the lower edge of the airbag 1 along the B-column B. The guide device 3 comprises a longitudinally extended element 30 in the form of a cable, one portion 31 of which is guided along the rear edge of the front window F and which is fastened with a free end 31a to the rear end of the lower edge of the airbag 1. By means of a deflection element 36 provided on a lower holding plate H2, the first cable portion 31 is deflected in such a way that, on that side of the first cable portion 31 which faces away from the window F, a second cable portion 32 extends parallel to the vertical vehicle axis as far as the lower free end 37 of a tension spring 38 which is fastened with its other end to the upper holding plate H1 serving for receiving the gas generator G. In the region of the lower free end of the tension spring 38, the cable 30 is deflected once again, so that, from there, a further cable portion 33 extends as far as the lower holding plate H2 to which that cable portion 33 is fixed with its free end 33a.

A further particular feature of the exemplary embodiment shown in FIG. 2 is that the first cable portion 31 does not run exactly parallel to the vertical vehicle access z or to the rear edge of the window F, but, instead, is inclined slightly rearwards. The lower edge of the airbag 1 is thereby additionally tautened during the deployment of the airbag, as will be explained below.

If, in the event of a crash, the occupant protection device shown in FIG. 2 is triggered, the airbag 1 is filled with gas by means of the gas generator G, the airbag 1 being deployed in the direction of the lower edge U of the front side window F. In this case, under the action of the tension spring 38, the rear end, connected to one free end 31a of the first cable portion 31, of the lower edge of the airbag 1 is moved in the direction of the lower deflection element 36 of the guide device 3. Since this movement does not take place exactly parallel to the vertical vehicle axis z, but, instead, has additionally a rearward component (directed towards the rear side of the corresponding vehicle in the vehicle longitudinal direction x), as a result of the associated displacement of the rear end of the lower edge of the airbag 1 the lower edge is additionally tautened and thereby tensioned. In this exemplary embodiment, too, a run-back stop 4, which is arranged-on the lower holding plate H2, prevents a run-back of the cable 30 after the deployment of the airbag 1, so that the lower edge of the airbag 1 is tensioned permanently along the tension line S between the front lower end E of the roof-edge region D and the lower deflection element 36.

It is advantageous, in the exemplary embodiments of the airbag arrangements which are illustrated in FIG. 1 and FIG. 2, in each case to guide the airbag (in the region of its rear lower end) according to the "flagpole principle", for which purpose the flexible traction means, serving in each case as a tautening element, in the form of a cable 20, 30 is guided by means of two deflection elements 26, 27 and 36, 37 which, spaced apart from another in the direction of deployment of the airbag 1 (that is to say, along the vertical vehicle axis z), are connected in each case to a part H1, H2 of the motor vehicle body. The respective cable 20, 30 is in this case guided, even before the deployment of the airbag 1 (that is to say, in the initial state before a triggering of the gas generator), between the respective deflection elements 26, 27 and 36, 37. After the triggering of the airbag module and during the deployment of the airbag 1, another portion of the cable 20 or 30 then moves in each case into the region between the two deflection elements 26, 27 and 36, 37, the rear lower end of the airbag 1 being taken up downwards.

This defined guidance of the respective cable 20, 30 according to the flagpole principle ensures a particularly reliable movement of the rear lower edge of the airbag 1 during deployment.

In this case, one deflection element (e.g., the upward deflection element 37 in the exemplary embodiment according to FIG. 2) can be connected indirectly via a further subassembly (for example, a tension spring 38) to the corresponding motor vehicle part H1, with the result that some movement of the deflection element 37 is brought about during the deployment of the airbag 1. In some embodiments of the invention, none of the deflection elements are connected to the airbag in such a way that, during the deployment of the airbag, the deflection element is taken up by the airbag and is moved jointly with a portion of the airbag in the direction of deployment. This could result in an undefined, inaccurately foreseeable positioning of the corresponding deflection element during the deployment of the airbag. This can be prevented when the flagpole principle is employed.

With reference to FIGS. 3 to 9, various possibilities for connecting a portion of the longitudinally extended element 20 or 30 to a portion of the airbag 1, particularly in the region of the rear end of the lower edge of the airbag 1, are illustrated. The airbag 1 in this case comprises one or more fabric parts which are stitched to one another to form a closed working space of the airbag. The longitudinally extended element designed as a cable or band may comprise, for example, plastic or woven material.

The connections, illustrated in FIGS. 3 to 5b, between an airbag and a longitudinally extended element in the form of a cable are in this case also suitable particularly for those instances in which the cable 20 forms a closed cable loop. This closed cable loop is produced by the connection, for example, welding, of the two free ends of a cable.

In the exemplary embodiment according to FIG. 3, a thickening 201, which is welded to a portion of the airbag 1, is formed on a portion of the cable 20.

In the exemplary embodiment according to FIG. 4, a widening piece, for example in the form of a flag 202, which is stitched to a portion of the airbag 1 by means of a seam 101, is formed on a portion of the cable 20.

According to FIG. 5a, a portion 50 of a clip element 5 is fastened to a part of the airbag casing 1 by means of a seam 51, the said clip element surrounding the cable 20 with a resiliently elastic end portion 55, into which the cable 20 can be introduced through an orifice 56, with the resilient elastic portion 55 being spread open.

FIG. 5b illustrates an arrangement in which the airbag 1 has a passage orifice 102, into which is threaded a portion 60. The portion 60 is provided with an introduction orifice 61, a clip element 6 that surrounds the cable 20, and a further portion 65 that surrounds the cable 20.

According to FIG. 6, the cable 20 has provided on it a holding device 204, to which the two free ends 210, 220 of the said are fastened in order to form a cable loop. In this case, a portion 203 of the cable 20 is additionally laid in the form of a loop around a dart 103 of the airbag 1, so that the cable 20 is thereby connected to the airbag 1.

In the exemplary embodiment according to FIG. 7, the two free ends 210, 220 of a longitudinally extended element 20 designed as a band are connected to the casing of an airbag 1 at a fastening point by means of a seam 104.

In the exemplary embodiment shown in FIG. 8a, the two free ends 210, 220 of a cable 20 are provided in each case with a thickening piece 211 and 221, by means of which they are held positively in corresponding indentations 71, 72 of the basic body 70 of a clip element 7. The clip element 7 has two clip portions 73,74 which are located opposite one another and which in each case positively surround an edge of a pocket 105 fastened to the casing of an airbag 1 by means of a seam 106.

In FIG. 8b, the casing of an airbag 1 likewise has fastened to it by means of a seam 106 a pocket 105, through which one end portion 210 of the cable 20 passes, whilst the other end portion 220 of the cable 20 is led past the pocket 105 on the outside. The two end portions 210, 220 of the cable 20 are connected to one another, on both sides of the pocket 105, at two fastening points 8a, 8b spaced apart from one another in the direction of extent of the cable 20, so that the pocket 105 is received positively between the two end portions 210, 220 of the cable 20 and the associated fastening elements 8a, 8b.

In the exemplary embodiment according to FIG. 9, one strand 20a of a cable 20 formed from two strands 20a, 20b passes through a pocket 107 formed in one piece on the casing of the airbag 1, so that the pocket 107 is received positively between the two strands 20a, 20b.

The priority application, German Patent Application DE 102 29 102.0, filed on Jun. 25, 2002, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant protection device for a motor vehicle occupant, comprising:
    an airbag arranged on a motor vehicle body in a region of a lateral roof edge of a motor vehicle, the airbag being configured to deploy downwards during inflation so that the inflated airbag extends in front of at least one side window of the motor vehicle; and
    a guide extending longitudinally along a vehicle pillar and being connected to a lower edge of the airbag; and
    wherein the guide is configured to move longitudinally along the pillar in the direction of deployment of the airbag, and the guide includes a closed loop.

2. The occupant protection device of claim 1, wherein the guide includes a flexible traction device.

3. The occupant protection device of claim 2, wherein the flexible traction device includes a cable or a band.

4. The occupant protection device of claim 2, wherein the flexible traction device is guided by a deflection element.

5. The occupant protection device of claim 1, further comprising a run-back stop configured to substantially prevent movement of the guide in a direction opposite to the direction of movement of the guide during the deployment of the airbag.

6. The occupant protection device of claim 1,
further comprising a run-back stop configured to substantially prevent movement of the guide in a direction opposite to the direction of movement of the guide during the deployment of the airbag, and
wherein the run-back stop is positioned adjacent to a deflection element.

7. The occupant protection device of claim 1, wherein the guide is guided by two deflection elements.

8. The occupant protection device of claim 7, wherein at least one of the deflection elements is connected to the vehicle body.

9. The occupant protection device of claim 8, wherein each of the deflection elements are connected directly to the vehicle body.

10. The occupant protection device of claim 8, further comprising a subassembly for connecting at least one deflection element to the vehicle body.

11. The occupant protection device of claim 7, wherein the two deflection elements are spaced apart from one another in the direction of deployment of the airbag.

12. The occupant protection device of claim 1,
wherein the guide is guided by two deflection elements.

13. The occupant protection device of claim 1, wherein the guide is configured to move at an inclination with respect to a main direction of deployment of the airbag so that a lower edge of the airbag is increasingly tautened during the deployment of the airbag.

14. The occupant protection device of claim 1, wherein the guide is guided or tautened so that no substantial deflection of the guide in a direction transverse to the longitudinal direction of the guide occurs during deployment of the airbag.

15. The occupant protection device of claim 1, wherein the guide is located on a vertical column of the motor vehicle.

16. The occupant protection device of claim 1, wherein an unreleasable connection connects the guide to the airbag.

17. The occupant protection device of claim 1, wherein the guide is releasably connected to the airbag.

18. The occupant protection device of claim 17, wherein the guide includes a flexible traction device that loops around a component attached to the airbag.

19. The occupant protection device of claim 1, wherein an orifice or a pocket is provided on the airbag and is configured to connect the airbag to the guide.

20. An occupant protection device for a motor vehicle occupant, comprising:
an airbag arranged on a motor vehicle body in a region of a lateral roof edge of a motor vehicle, the airbag being configured to deploy downwards during inflation so that the inflated airbag extends in front of at least one side window of the motor vehicle; and
a guide extending longitudinally and being connected to a lower edge of the airbag, wherein the guide is movably guided on the motor vehicle body in the direction of deployment of the airbag, and
wherein at least part of the guide is attached to a plate configured to hold a gas generator for inflating the airbag.

21. An occupant protection device for a motor vehicle occupant, comprising:
an airbag arranged on a motor vehicle body in a region of a lateral roof edge of a motor vehicle, the airbag being configured to deploy downwards during inflation so that the inflated airbag extends in front of at least one side window of the motor vehicle; and
a guide extending longitudinally along a vehicle pillar and being connected to a lower edge of the airbag; and
wherein the guide is configured to move longitudinally along the pillar in the direction of deployment of the airbag, and
wherein the lower edge of the airbag is connected at a first end of the guide and is connected at a second end to the vehicle body.

22. An occupant protection device for a motor vehicle occupant, comprising:
an airbag arranged on a motor vehicle body in a region of a lateral roof edge of a motor vehicle, the airbag being configured to deploy downwards during inflation so that the inflated airbag extends in front of at least one side window of the motor vehicle; and
a guide extending longitudinally along a vehicle pillar and being connected to a lower edge of the airbag; and
wherein the guide is configured to move longitudinally along the pillar in the direction of deployment of the airbag, and
wherein an unreleasable connection connects the guide to the airbag, the unreleasable connection is formed by welding, adhesive bonding or stitching.

23. An occupant protection device for a motor vehicle occupant, comprising:
an airbag arranged on a motor vehicle body in a region of a lateral roof edge of a motor vehicle, the airbag being configured to deploy downwards during inflation so that the inflated airbag extends in front of at least one side window of the motor vehicle; and
a guide extending longitudinally and being connected to a lower edge of the airbag, wherein the guide is movably guided on the motor vehicle body in the direction of deployment of the airbag,
wherein the guide is releasably connected to the airbag, and
wherein the connection between the guide and the airbag is formed by a clip.

24. An occupant protection device for a motor vehicle occupant, comprising:
an airbag arranged on a motor vehicle body in a region of a lateral roof edge of a motor vehicle, the airbag being configured to deploy downwards during inflation so that the inflated airbag extends in front of at least one side window of the motor vehicle; and
a guide extending longitudinally and being connected to a lower edge of the airbag,
wherein the guide is movably guided on the motor vehicle body in the direction of deployment of the airbag,
wherein the guide is releasably connected to the airbag,
wherein the guide includes a flexible traction device that loops around a component attached to the airbag, and the component includes a dart.

25. A protection device for motor vehicle occupants, comprising:
an airbag configured to deploy downward along the side of the vehicle;
a flexible cable mounted along a pillar of the vehicle and extending in a substantially vertical direction;
wherein the cable is connected to a lower edge of the airbag and is configured to move as the airbag deploys to guide and tauten the lower edge of the airbag, and
wherein at least part of the guide is attached to a plate configured to hold a gas generator for inflating the airbag.

26. The occupant protection device of claim 25, wherein the cable is a closed loop.

27. The occupant protection device of claim 26, wherein the cable is guided by a deflection element.

\* \* \* \* \*